United States Patent [19]

Welch et al.

[11] Patent Number: 5,416,179
[45] Date of Patent: May 16, 1995

[54] CATALYST COMPOSITIONS AND OLEFIN POLYMERIZATION

[75] Inventors: M. Bruce Welch, Bartlesville; Paul Barbee, Dewey, both of Okla.

[73] Assignee: Phillips Petroleum Company, Bartlesville, Okla.

[21] Appl. No.: 213,781

[22] Filed: Mar. 16, 1994

[51] Int. Cl.⁶ .............................................. C08F 4/642
[52] U.S. Cl. .................................. 526/160; 526/170; 526/121; 526/122; 526/126; 526/127; 526/348; 526/348.5; 526/352; 502/117; 502/118; 502/108; 502/103; 502/152
[58] Field of Search ............... 526/160, 170, 121, 122, 526/126, 127; 502/108, 117, 118, 103, 152

[56] References Cited

U.S. PATENT DOCUMENTS

| | | | |
|---|---|---|---|
| 3,404,096 | 10/1968 | Lamborn | 502/108 |
| 4,471,064 | 9/1984 | Buehler | 502/108 |
| 4,471,065 | 9/1984 | Buehler et al. | 502/108 |
| 4,665,047 | 5/1987 | Slaugh et al. | 502/108 |
| 5,183,867 | 2/1993 | Welborn, Jr. | 526/114 |
| 5,278,272 | 1/1994 | Lai et al. | 526/348.5 |

OTHER PUBLICATIONS

Boor, Ziegler-Natta Catalysts and Polymerizations, Acad. Press New York, 1979, 512–515.

Primary Examiner—Mark Nagumo
Attorney, Agent, or Firm—Marianne H. Michel

[57] ABSTRACT

A process for the polymerization of mono-1-olefins employing a catalyst composition comprising a metallocene compound and isobutene. The catalyst composition exhibits improved productivity. In a preferred embodiment an aluminoxane is employed as a cocatalyst.

21 Claims, No Drawings

CATALYST COMPOSITIONS AND OLEFIN POLYMERIZATION

BACKGROUND OF THE INVENTION

The present invention relates to olefin polymerization employing a catalyst composition comprising a metallocene compound and isobutene.

In the production of polyolefins, such as for example polyethylene, an important aspect of the various processes and catalysts used to produce such polymers is the productivity. By productivity is meant the amount of yield of solid polymer that is obtained by employing a given quantity of catalyst per unit of time. If the productivity is high enough, then the amount of catalyst residues contained in the polymer is low enough that the presence of the catalyst residues does not significantly affect the properties of the polymer, and the polymer does not require additional processing to remove the catalyst residues. As those skilled in the art are aware, removal of catalyst residues from polymer is an expensive process. It is thus desirable to employ a catalyst which provides sufficient productivity that catalyst residue removal is not necessary.

SUMMARY OF THE INVENTION

An object of this invention is to provide a catalyst composition having relatively high productivity.

Another object of this invention is to provide a simple and inexpensive process for preparing a catalyst composition having relatively high productivity.

Another object of the invention is to provide a polymerization process in which the polymer produced contains catalyst residues in an amount so that catalyst residue removal is unnecessary.

In accordance with the invention a catalyst composition comprising isobutene and a metallocene compound containing a transition metal of Group IVB or Group VB of the Periodic Table and a process for preparing the catalyst composition are provided.

In accordance with another aspect of the invention a process for the polymerization of mono-1-olefins employing the catalyst composition is provided.

DETAILED DESCRIPTION OF THE INVENTION

Suitable metallocene compounds that can be employed include any metallocene compounds known in the art. Examples of suitable metallocene compounds, their preparation, suitable cocatalysts, and their use in polymerization processes are described in detail in U.S. Pat. Nos. 5,091,352; 5,057,475; 5,124,418; and EP 524,624 published Jan. 27, 1993, the disclosures of which are herein incorporated by reference.

Metallocene compounds, as used herein, are represented by the formulas $L_xM(R_1)_n$ or

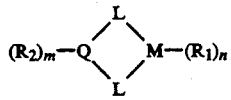

wherein each L is a ligand selected from cyclopentadienyl-type radicals having 5 to 30 carbon atoms, x is 1 to 4, M is a Group IVB or VB transition metal, each $R_1$ is individually selected from the group consisting of alkyl, cycloalkyl, alkenyl, aryl, alkaryl and, aralkyl radicals having 1 to 30 carbon atoms, alkoxy radicals having 1 to 30 carbon atoms, aryloxy radicals having 6 to 30 carbon atoms, halogen, and hydrogen, n is 1 to 3 and is the number corresponding to the value needed to form a stable complex, Q is a bridging radical selected from the group consisting of silicon, germanium, tin, and carbon, each $R_2$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, halogen and hydrogen, and m is 1 or 2.

Cyclopentadienyl-type radicals, as used herein, include unsubstituted cyclopentadienyl, substituted cyclopentadienyl, unsubstituted indenyl, substituted indenyl, unsubstituted fluorenyl, and substituted fluorenyl. The substituents can be, for example hydrocarbyl radicals containing 1 to 12 carbon atoms, alkoxy radicals containing 1 to 12 carbon atoms, or halogen, preferably the hydrocarbyl radical substitutents are alkyl radicals containing 1 to 5 carbon atoms. Typical substituents include methyl, ethyl, propyl, butyl, amyl, isoamyl, hexyl, isobutyl, heptyl, octyl, nonyl, decyl, cetyl, 2-ethylhexyl, pentenyl, butenyl, cyclopentenyl, and phenyl. The metallocene can contain one, two, three, or four cyclopentadienyl-type radicals, preferably two. L can be bridged to another L through silicon, germanium, tin, or carbon.

M is selected from Group IVB or VB transition metals, preferably titanium, zirconium, hafnium, or vanadium, and more preferably hafnium or zirconium. Preferably each $R_2$ is a hydrocarbyl radical containing 1 to 20 carbon atoms and each $R_1$ is a halogen or a hydrocarbyl radical containing 1 to 20 carbon atoms.

Examples of suitable metallocene compounds include bis(cyclopentadienyl) zirconium dichloride, bis(cyclopentadienyl) zirconium dibromide, bis(cyclopentadienyl) zirconium diiodide, bis(methylcyclopentadienyl) zirconium dichloride, bis(n-butylcyclopentadienyl) zirconium dichloride, bis(cyclopentadienyl) hafnium dichloride, bis(methylcyclopentadienyl) hafnium dichloride, bis(n-butylcyclopentadienyl) hafnium dichloride, bis(cyclopentadienyl) titanium dichloride, bis(methylcyclopentadienyl) titanium dichloride, bis(n-butylcyclopentadienyl) titanium dichloride, bis(cyclopentadienyl) zirconium methyl chloride, bis(methylcyclopentadienyl) zirconium ethyl chloride, bis(n-butylcyclopentadienyl) zirconium phenyl chloride, bis(cyclopentadienyl) titanium methyl chloride, bis(methylcyclopentadienyl) titanium ethyl chloride, bis(n-butylcyclopentadienyl) titanium phenyl chloride, bis(cyclopentadienyl) hafnium methyl chloride, bis(methylcyclopentadienyl) hafnium ethyl chloride, bis(n-butylcyclopentadienyl) hafnium phenyl chloride, bis(cyclopentadienyl) zirconium dimethyl, bis(methylcyclopentadienyl) zirconium dimethyl, bis(n-butylcyclopentadienyl) zirconium dimethyl, bis(cyclopentadienyl) hafnium dimethyl, bis(methylcyclopentadienyl) hafnium dimethyl, bis(n-butylcyclopentadienyl) hafnium dimethyl, pentamethylcyclopentadienyl hafnium trichloride, bis(cyclopentadienyl) titanium dimethyl, bis(methylcyclopentadienyl) titanium dimethyl, bis(n-butylcyclopentadienyl) titanium dimethyl, pentamethylcyclopentadienyl titanium trichloride, bis(pentamethylcyclopentadienyl) hafnium diphenyl, bis(pentamethylcyclopentadienyl) titanium diphenyl, pentaethylcyclopentadienyl zirconium trichloride, (9-fluorenyl)(cyclopentadienyl) methane zirconium dichloride, fluorenyl cyclopentadienyl dimethyl methane zirconium dichloride, 1,2-bis-indenyl hafnium dichloride, bis(indenyl) titanium diphenyl, bis(indenyl) hafnium diphenyl, bis(indenyl) zirconium dichloride, but-3-enyl methyl (9-fluorenyl) cyclopentadienyl methane zirconium dichloride, 9-(2-but-3-enyl-fluorenyl) cyclopentadienyl methane zirconium dichloride, bis fluorenyl methane zirconium dichloride, and the like. Preferred metallocene compounds are bis(cyclopentadienyl)zirconium dichloride, bis(n-butylcyclopentadienyl)zirconium dichloride, bis(cyclopentadienyl)zirconium dimethyl or bis(n-butylcyclopentadienyl)zirconium dimethyl The amount of isobutene present in the catalyst composition can vary over a broad range and is an effective amount sufficient to increase the productivity of the catalyst composition. Generally, the amount of metallocene compound relative to the amount of isobutene is in the range of from about 0.001 grams to about 100 grams metallocene compound per kilogram isobutene, preferably from about 0.01 grams to about 50 grams metallocene compound per kilogram isobutene, and more preferably from 0.05 grams to 10 grams metallocene compound per kilogram isobutene.

The metallocene compound and the isobutene can be contacted over a broad range of conditions. Generally the temperature will be in the range of from about 0° C. to about 200° C., preferably about 10° C. to about 150° C. The metallocene compound can be contacted with isobutene prior to polymerization or the metallocene compound can be contacted with isobutene during polymerization.

Generally, organometallic cocatalysts disclosed in the above identified patents can be employed to produce a catalyst system. Aluminoxanes are preferred as cocatalysts and methylaluminoxane is especially preferred. Aluminoxanes are well known in the an and comprise linear and/or cyclic alkyl aluminoxanes represented by the formulas:

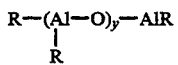

for oligomeric, linear aluminoxanes; and

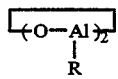

for oligomeric cyclic aluminoxanes;
wherein n is 2 to 50, preferably 4 to 40, m is 3–50, preferably 4–40 and R is an alkyl group containing 1–8 carbon atoms. Generally the aluminoxanes are more active when y and z are greater than 4, more preferably at least about 10. Typically R is predominantly methyl or ethyl. Preferably at least about 30 mole. Typically R is predominantly methyl or ethyl. Preferably at least about 30 mole percent of the repeating groups have an R which is methyl, more preferably at least 50 mole percent, and still more preferably at least 70 mole percent of the repeating units have methyl as the R group. Generally in the preparation of aluminoxane, a mixture of linear and cyclic compounds is obtained.

Aluminoxanes are commercially available in the form of hydrocarbon solutions, generally aromatic hydrocarbon solutions. Such aluminoxanes can contain significant amounts of unreacted yet strongly bonded trialkylaluminums, such as trimethylaluminum. Preferably the aluminoxane is precipitated for use in polymerization processes. This can be accomplished by reaction with a borane compound or an organo boroxine such as catechol borane, diphenyl borinic anhydride, dibutyl borinic anhydride, trimethylene borate, methyl catechol borane, trimethyl boroxine, triethyl boroxine, tri-n-propyl boroxine, tributyl boroxine, and tricyclohexyl boroxine.

A variety of olefin compounds are suitable for use in the process of the present invention. Olefins which can be employed include aliphatic mono-1-olefins. While the invention would appear to be suitable for use with any aliphatic mono-1-olefin, those olefins having 2 to 18 carbon atoms are most often used. Ethylene is especially preferred. Often a second mono-1-olefin (comonomer) having from 2 to 12 carbon atoms, preferably from 4 to 10 carbon atoms can be employed. Preferred comonomers include 1-butene, 1-pentene, 4-methyl-1-pentene, 1-hexene, and 1-heptene and 1-hexene is most preferred.

The reaction conditions for contacting the olefin, the isobutene, the metallocene compound, and the organometallic cocatalyst, if employed can vary broadly depending on the olefin employed, and are those sufficient to polymerize the mono-1-olefins. Generally the temperature is in the range of about 20° C. to about 200° C., preferably in the range of 50° C. to 150° C. The pressure is generally in the range of from about 0.5 MPa to about 5.0 MPa (70–725 psi).

The polymerization processes according to the present invention can be performed either batchwise or continuously. The olefin, catalyst composition, isobutene, and cocatalyst, if employed, can be contacted in any order. In a batch process, for example, a stirred autoclave is prepared by first purging with nitrogen and then with a suitable compound, such as isobutane for example. When a catalyst and a cocatalyst are employed either can be charged to the reactor first or they can be charged simultaneously. After closing the entry port, a diluent such as isobutane is added to the reactor. If desired, a chain terminating agent such as hydrogen or the like, can be added. The reactor is heated to the desired reaction temperature and olefin, such as ethylene, is then admitted and maintained at a partial pressure within a range of from about 0.5 MPa to about 5.0 MPa (70–725 psi) for best results. At the end of the designated reaction period, the polymerization reaction is terminated and the unreacted olefin and diluent can be vented. The reactor can be opened and the polymer can be collected as a free-flowing white solid and dried to obtain the product.

The present invention is particularly useful in a slurry type polymerization. A particularly preferred type slurry polymerization involves a continuous loop reactor which is continuously charged with suitable quantities of diluent, catalyst, cocatalyst, polymerizable compounds and isobutene, and in any desirable order. The reaction product can be continuously withdrawn and the polymer recovered as appropriate, generally by flashing the diluent (solvent) and unreacted monomers and drying the resulting polymer.

The amount of isobutene relative to the amount of diluent, when employed, will be in the range of from about 0.01 to about 100 weight percent isobutene based on the weight of diluent, preferably about 0.1 to about 50 weight percent, and more preferably from 0.5 to 10 weight percent isobutene.

The following example will serve to show the present invention in detail by way of illustration and not by way of limitation.

EXAMPLE

The following example demonstrates the effect of isobutene on the productivity of metallocene compounds.

Bis(n-butylcyclopentadienyl)zirconium dichloride supported on precipitated Methylaluminoxane (MAO) was employed in the polymerizations below.

MAO obtained from Scherring as a 10 weight percent MAO solution in toluene was precipitated by slurrying MAO in hexane at room temperature. Then [(MeO)BO]$_3$ was added dropwise and the mixture was stirred for 60 minutes. The thus produced MAO solids were then filtered and dried. The process was repeated three times and the MAO solids were combined.

Bis(n-butylcyclopentadienyl)zirconium dichloride, was prepared by reacting 3 g (24.6 mmol) n-butylcyclopentadiene dissolved in ether and 15.4 ml (24.6) n-butyllithium dissolved in hexane at 0° C. with stirring for 3 hours. Then 2.86 g (12.3 mmol) ZrCl$_4$ was added in portions over a 20 minute period with vigorous stirring. The resulting slurry was stirred at room temperature for 2 hours and then the ether was removed under vacuum. The residue was extracted with two 100 mL hexane portions and then filtered. The resulting brown solution was cooled to 10° C. After standing overnight the colorless precipitate was collected and dried under vacuum.

Then 60 g (1.03 moles) precipitated MAO and a 100 mL hexane solution containing 0.835 g (0.00207 moles) bis(n-BuCp)ZrCl$_2$ were slurried in 500 mL hexane for three hours at room temperature. The thus produced metallocene/MAO solids were filtered and dried. The solids yield was 60 g and contained 1.5 weight percent zirconium. Another batch produced in a similar manner was combined with the solids and the combined solids were employed as the catalyst system in the polymerizations below.

The polymerization reactions were conducted in a 1-gallon stirred autoclave reactor. Approximately 0.075 g metallocene/MAO solids and a predetermined amount of isobutene in 2 liters isobutane were charged to a dry reactor under counterflow of ethylene at ambient temperature. The reactor temperature was increased to about 100° C. The total pressure was about 450 psig. The reaction temperature and pressure were maintained for about one hour. The isobutane was then removed and the polymer collected as a dry fluff. The results employing varying amounts of isobutene are represented in Table 1.

In the following table, productivity is in g polymer/g catalyst·hour. MI is melt index in g/10 minutes, measured according to ASTM D 1238-88, condition 190/2.16. Density is in g/cc, measured according to ASTM D 1505-68.

TABLE 1

| Run No. | Isobutene (g) | Hexene (g) | Productivity (g/g · hr) | MI (g/10 min.) | Density (g/cc) |
|---|---|---|---|---|---|
| 101 | 0 | 0 | 2059 | 0.39 | 0.9506 |
| 102 | 25 | 0 | 2160 | 0.72 | 0.9500 |
| 103 | 50 | 0 | 3897 | 0.77 | 0.9502 |
| 104 | 0 | 10 | 598 | 0.86 | 0.9376 |
| 105 | 50 | 10 | 1321 | 1.23 | 0.9433 |

Table 1 demonstrates increased catalyst productivity and MI when employing isobutene compared to the polymerization where isobutene was absent. NMR results indicated that isobutene was not incorporated into the polymer.

That which is claimed is:

1. A polymerization process comprising contacting under polymerization conditions at least one mono-1-olefin, isobutene, and a metallocene compound represented by the formulas L$_x$M(R$_1$)$_n$ or

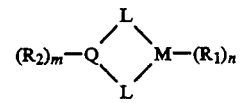

wherein each L is a ligand selected from unsubstituted or substituted cyclopentadienyl, unsubstituted or substituted indenyl or unsubstituted or substituted fluorenyl wherein the substituents are hydrocarbyl radicals containing 1 to 12 carbon atoms, alkoxy radicals containing 1 to 12 carbon atoms, or halogen, x is 1 to 4, M is a Group IVB or VB transition metal, each R$_1$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, and halogen, n is 1 to 3 and is the number corresponding to the value needed to form a stable complex, Q is a bridging radical selected from the group consisting of silicon, germanium, tin, and carbon, each R$_2$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, halogen and hydrogen, and m is 1 or 2.

2. A process according to claim 1 wherein the amount of metallocene compound relative to the amount of isobutene is in the range of from about 0.001 grams to about 100 grams metallocene compound per kilogram isobutene.

3. A process according to claim 2 wherein the amount of metallocene compound is in the range of from about 0.01 grams to about 50 grams metallocene compound per kilogram isobutene.

4. A process according to claim 3 wherein the amount of metallocene compound is in the range of from 0.05 grams to 10 grams metallocene compound per kilogram isobutene.

5. A process according to claim 1 further comprising contacting said metallocene compound with an aluminoxane cocatalyst.

6. A process according to claim 5 wherein said cocatalyst comprises methylaluminoxane.

7. A process according to claim 6 wherein said cocatalyst comprises solid methylaluminoxane.

8. A process according to claim 1 wherein said polymerization conditions include a temperature in the range of 20° C. to 200° C.

9. A process according to claim 8 wherein said polymerization conditions include a temperature in the range of 50° C. to 150° C.

10. A process according to claim 9 wherein said at least one mono-1-olefin comprises ethylene.

11. A process according to claim 10 wherein said at least one mono-1-olefin further comprises 1-hexene.

12. A process according to claim 1 wherein said metallocene compound contains titanium, zirconium, or hafnium.

13. A process according to claim 12 wherein said metallocene compound contains zirconium.

14. A process according to claim 13 wherein said metallocene compound is bis(cyclopentadienyl)zirconium dichloride, bis(n-butylcyclopentadienyl)zirconium dichloride, bis(cyclopentadienyl)zirconium dimethyl or bis(n-butylcyclopentadienyl)zirconium dimethyl.

15. A process according to claim 1 wherein $R_1$ is a halogen or a hydrocarbyl radical containing 1 to 20 carbon atoms and wherein $R_2$ is a hydrocarbyl radical containing 1 to 20 carbon atoms.

16. A process for preparing a polymerization catalyst composition comprising contacting isobutene and a metallocene compound containing a transition metal of Group IVB or Group VB, wherein said metallocene compound is represented by the formulas $L_xM(R_1)_n$ or

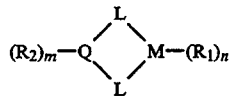

wherein each L is a ligand selected from unsubstituted or substituted cyclopentadienyl, unsubstituted or substituted indenyl or unsubstituted or substituted fluorenyl wherein the substituents are hydrocarbyl radicals containing 1 to 12 carbon atoms, alkoxy radicals containing 1 to 12 carbon atoms, or halogen, x is 1 to 4, M is a Group IVB or VB transition metal, each $R_1$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, and halogen, n is 1 to 3 and is the number corresponding to the value needed to form a stable complex, Q is a bridging radical selected from the group consisting of silicon, germanium, tin, and carbon, each $R_2$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, halogen and hydrogen, and m is 1 or 2; and wherein the amount of metallocene compound relative to the amount of isobutene is in the range of from about 0.001 grams to about 100 grams metallocene compound per kilogram isobutene.

17. A process according to claim 16 further comprising contacting an aluminoxane cocatalyst.

18. A polymerization catalyst composition comprising isobutene and a metallocene compound represented by the formulas $L_xM(R_1)_n$ or

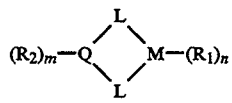

wherein each L is a ligand selected from unsubstituted or substituted cyclopentadienyl, unsubstituted or substituted indenyl or unsubstituted or substituted fluorenyl wherein the substituents are hydrocarbyl radicals containing 1 to 12 carbon atoms, alkoxy radicals containing 1 to 12 carbon atoms, or halogen, x is 1 to 4, M is a Group IVB or VB transition metal, each $R_1$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, and halogen, n is 1 to 3 and is the number corresponding to the value needed to form a stable complex, Q is a bridging radical selected from the group consisting of silicon, germanium, tin, and carbon, each $R_2$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, halogen and hydrogen, and m is 1 or 2; and wherein the amount of metallocene compound relative to the amount of isobutene is in the range of from about 0.001 grams to about 100 grams metallocene compound per kilogram isobutene.

19. A catalyst composition according to claim 18 further comprising an aluminoxane cocatalyst.

20. A catalyst composition according to claim 19 wherein said metallocene compound contains zirconium and said cocatalyst is a methylaluminoxane.

21. A polymerization catalyst system consisting essentially of isobutene, a metallocene compound, and an aluminoxane cocatalyst wherein the metallocene compound is represented by the formulas $L_xM(R_1)_n$ or

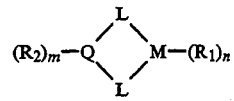

wherein each L is a ligand selected from unsubstituted or substituted cyclopentadienyl, unsubstituted or substituted indenyl or unsubstituted or substituted fluorenyl wherein the substituents are hydrocarbyl radicals containing 1 to 12 carbon atoms, alkoxy radicals containing 1 to 12 carbon atoms, or halogen, x is I to 4, M is a Group IVB or VB transition metal, each $R_1$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, and halogen, n is 1 to 3 and is the number corresponding to the value needed to form a stable complex, Q is a bridging radical selected from the group consisting of silicon, germanium, tin, and carbon, each $R_2$ is individually selected from the group consisting of alkyl, cycloalkyl, alkenyl, aryl, alkaryl, and aralkyl radicals having 1 to 30 carbon atoms, alkoxy radicals having 1 to 30 carbon atoms, aryloxy radicals having 6 to 30 carbon atoms, halogen and hydrogen, and m is 1 or 2; and wherein the amount of metallocene compound relative to the amount of isobutene is in the range of from about 0.001 grams to about 100 grams metallocene compound per kilogram isobutene.

* * * * *